(12) United States Patent  
Yagisawa

(10) Patent No.: US 9,798,097 B2  
(45) Date of Patent: Oct. 24, 2017

(54) OPTICAL MODULE

(71) Applicant: FUJITSU LIMITED, Kawasaki-shi, Kanagawa (JP)

(72) Inventor: Takatoshi Yagisawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/277,647

(22) Filed: Sep. 27, 2016

(65) Prior Publication Data

US 2017/0097476 A1    Apr. 6, 2017

(30) Foreign Application Priority Data

Oct. 2, 2015 (JP) ................................. 2015-196922

(51) Int. Cl.
*G02B 6/42* (2006.01)

(52) U.S. Cl.
CPC ............. *G02B 6/424* (2013.01); *G02B 6/421* (2013.01); *G02B 6/428* (2013.01); *G02B 6/4257* (2013.01); *G02B 6/4292* (2013.01)

(58) Field of Classification Search
CPC ...... G02B 6/424; G02B 6/4292; G02B 6/428; G02B 6/421; G02B 6/4257
See application file for complete search history.

(56) References Cited

U.S. PATENT DOCUMENTS

| 6,116,791 | A * | 9/2000 | Laninga | G02B 6/3829 385/83 |
| 6,594,435 | B2 * | 7/2003 | Tourne | G02B 6/3887 385/134 |
| 6,632,027 | B1 | 10/2003 | Yoshida et al. | |
| 7,802,927 | B2 * | 9/2010 | Benjamin | G02B 6/25 385/31 |
| 8,376,633 | B2 * | 2/2013 | Nishimura | G02B 6/4202 385/32 |
| 8,485,738 | B2 * | 7/2013 | Rosenberg | G02B 6/3829 385/71 |
| 2007/0263957 | A1 | 11/2007 | Shimizu et al. | |
| 2008/0240657 | A1 * | 10/2008 | Dean | G02B 6/3829 385/78 |
| 2013/0077920 | A1 | 3/2013 | Matsue et al. | |
| 2015/0346435 | A1 * | 12/2015 | Kato | G02B 6/3887 385/78 |

FOREIGN PATENT DOCUMENTS

| JP | 2000-56190 | 2/2000 |
| JP | 2008-140870 | 6/2008 |
| JP | 2013-29639 | 2/2013 |
| JP | 2013-69883 | 4/2013 |
| WO | 2006/025523 | 3/2006 |

* cited by examiner

*Primary Examiner* — Thomas A Hollweg
*Assistant Examiner* — Erin Chiem
(74) *Attorney, Agent, or Firm* — Fujitsu Patent Center

(57) ABSTRACT

An optical module includes: a board configured to be equipped with an optical element that carries out photoelectric conversion; a flexible optical waveguide configured to guide light output from the optical element or light to be input to the optical element; and a chassis including: a housing part configured to house the board, and a passage configured to lead the flexible optical waveguide to outside of the housing part and bend in such a manner that one or more steps are formed along a wave guiding direction of the flexible optical waveguide.

10 Claims, 5 Drawing Sheets

OPTICAL MODULE

CROSS-REFERENCE TO RELATED APPLICATION

This application is based upon and claims the benefit of priority of the prior Japanese Patent Application No. 2015-196922, filed on Oct. 2, 2015, the entire contents of which are incorporated herein by reference.

FIELD

The embodiment discussed herein is related to an optical module.

BACKGROUND

As a module for coupling between devices that carry out optical communications, a pluggable optical module that can be easily attached to a cage and removed from the cage is used.

A related art is disclosed in Japanese Laid-open Patent Publication No. 2013-69883 or Japanese Laid-open Patent Publication No. 2013-29639.

SUMMARY

According to an aspect of the embodiment, an optical module includes: a board configured to be equipped with an optical element that carries out photoelectric conversion; a flexible optical waveguide configured to guide light output from the optical element or light to be input to the optical element; and a chassis including: a housing part configured to house the board, and a passage configured to lead the flexible optical waveguide to outside of the housing part and bend in such a manner that one or more steps are formed along a wave guiding direction of the flexible optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, an optical module is used at a front panel of a server in order to couple a server blade and an optical cable. The optical module converts light input from the optical cable to an electrical signal and outputs the electrical signal to the server blade. The optical module converts an electrical signal input from the server blade to light and outputs the light to the optical cable.

The optical module includes, in a chassis, a board equipped with a photoelectric conversion element that carries out conversion between an electrical signal and light. Light output from the photoelectric conversion element or light to be input to the photoelectric conversion element is guided by a flexible optical waveguide extending from the board. The optical waveguide is inserted in a passage formed in the chassis and is led to the outside of the chassis.

When such an optical module is used, electromagnetic interference (EMI), in which electromagnetic wave noise generated in the optical module affects the surroundings, may be reduced. For example, as a countermeasure for reducing the electromagnetic wave noise, an electromagnetic shield member may be added between the chassis of the optical module and a cage for example. Furthermore, the chassis of the optical module may be covered by a metal piece.

For example, reduction in the electromagnetic wave noise that leaks from the passage that leads the optical waveguide to the outside of the chassis of the optical module might not be considered.

For example, in the case in which the electromagnetic shield member is added between the optical module and the cage, the electromagnetic wave noise might leak from the passage that leads the optical waveguide to the outside of the chassis because the passage that leads the optical waveguide to the outside of the chassis is not covered by the electromagnetic shield member. In the case in which the chassis of the optical module is covered by the metal piece, the electromagnetic wave noise might leak from the passage that leads the optical waveguide to the outside of the chassis because the passage that leads the optical waveguide to the outside of the chassis is not covered by the metal piece.

The disclosed techniques are not limited by the following disclosure. In the following, the same constituent member might be given the same symbol and overlapping description might be omitted.

Figure 1:
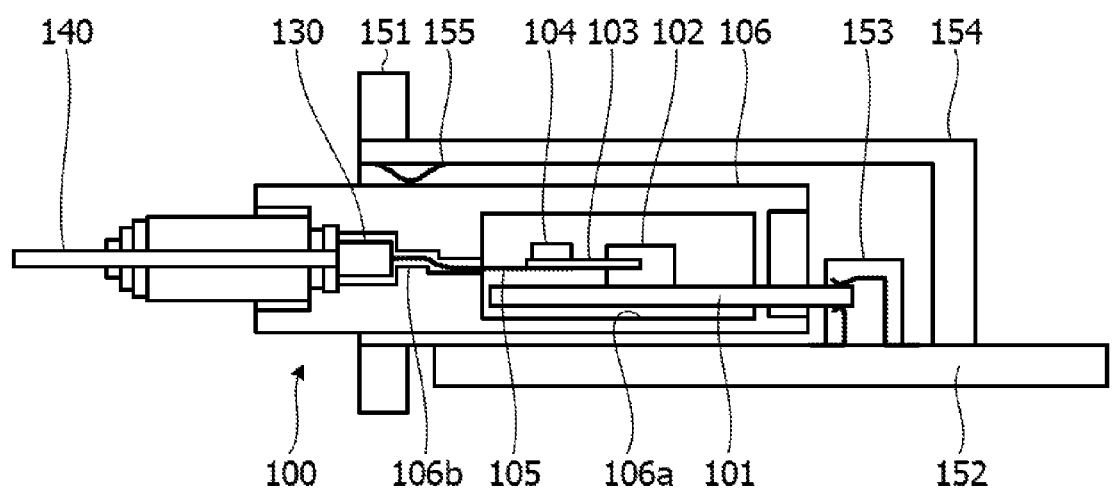
FIG. 1 illustrates one example of an internal configuration of an optical module.

FIG. 1 illustrates one example of an internal configuration of an optical module. In FIG. 1, an optical module 100 may be a pluggable optical module used at a front panel 151 of a server in order to couple a server blade and an optical cable 140. The optical module 100 is insertably and removably attached to a cage 154 set on a printed board 152 of the server blade. The optical module 100 converts light input from the optical cable 140 to an electrical signal and outputs the electrical signal to the server blade. Meanwhile, the optical module 100 converts an electrical signal input from the server blade to light and outputs the light to the optical cable 140.

The optical module 100 includes a printed board 101, an electrical connector 102, flexible printed circuits (FPC) 103, an optical waveguide 105, and a chassis 106. Furthermore, the optical module 100 includes a photoelectric conversion element 104 on the FPC 103.

The printed board 101 is disposed inside the chassis 106. A card edge connector is formed at one end part of the printed board 101 in the longitudinal direction, e.g. the right end in FIG. 1. The optical module 100 is coupled to an electrical connector 153 on the printed board 152 of the server blade via this card edge connector. On at least the upper surface of the printed board 101, an interconnect pattern is formed between the card edge connector and the electrical connector 102. This interconnect pattern transmits the electrical signal.

An interconnect pattern is formed on at least the upper surface of the FPC 103. The FPC 103 are electrically coupled to the interconnect pattern formed on the printed board 101 via the electrical connector 102.

The photoelectric conversion element 104 as an optical element is mounted on the upper surface of the FPC 103. The photoelectric conversion element 104 converts an electrical signal input via the electrical connector 102 to light and meanwhile converts light input via the optical waveguide 105 to an electrical signal. Due to the mounting of the photoelectric conversion element 104 on the FPC 103, a photoelectric converter that carries out conversion between the electrical signal and the light is formed.

The optical waveguide 105 that transmits light is attached to the lower surface of the FPC 103. For example, the optical waveguide 105 may be a sheet-shaped optical waveguide having flexibility and may be e.g. a polymer waveguide. The optical waveguide 105 extends from the FPC 103 and guides light output from the photoelectric conversion element 104 or light to be input to the photoelectric conversion element 104. An optical connector 130 is provided at one end of the optical waveguide 105.

The chassis 106 may include an electrically-conductive material, e.g. a metal. The chassis 106 includes a housing part 106a and a passage 106b made to communicate with the housing part 106a. The housing part 106a houses the printed board 101, the FPC 103, and so forth. In the housing part 106a, an opening that exposes the card edge connector at the right end of the printed board 101 to the outside of the housing part 106a is formed.

The passage 106b is a passage that leads the optical waveguide 105 to the outside of the housing part 106a. The passage 106b bends in such a manner that a step due to a depression along the thickness direction of the FPC 103 is formed. For example, the passage 106b bends in such a manner that the step is formed along the wave guiding direction of the optical waveguide 105. In the example of FIG. 1, the passage 106b bends into a crank shape so that one step due to a depression along the thickness direction of the FPC 103 may be formed. For example, by providing an electromagnetic shield member 155 between the chassis 106 of the optical module 100 and the cage 154, electromagnetic wave noise that leaks from the gap between the chassis 106 and the cage 154 may be blocked. However, if the passage 106b that leads the optical waveguide 105 to the outside of the chassis 106 is not covered by the electromagnetic shield member 155, electromagnetic wave noise generated in the housing part 106a might leak from the passage 106b.

For example, the passage 106b may be provided with another electromagnetic shield member. However, if the passage 106b is provided with another electromagnetic shield member, the device configuration may increase in complexity and size in accordance with increase in the number of parts. For example, in the optical module 100 illustrated in FIG. 1, the passage 106b bends in such a manner that a step due to a depression along the thickness direction of the FPC 103 is formed. For example, the passage 106b bends in such a manner that the step is formed along the wave guiding direction of the optical waveguide 105. For this reason, electromagnetic wave noise generated in the housing part 106a (for example, electromagnetic wave noise radiated from the FPC 103, the printed board 101, and so forth) is blocked by the step of the passage 106b. As a result, electromagnetic wave noise that leaks from the passage 106b that leads out the optical waveguide 105 might be reduced. For example, in the optical module 100 illustrated in FIG. 1, the electromagnetic shield member 155 may be provided between the chassis 106 and the cage 154.

For example, the passage 106b leads the optical waveguide 105 to the outside of the housing part 106a in the state in which the bend radius of the optical waveguide 105 is kept equal to or smaller than a given value. For example, the width of the step of the passage 106b along the thickness direction of the FPC 103 is so selected that the bend radius of the optical waveguide 105 inserted in the passage 106b is kept equal to or smaller than the given value. In terms of reducing the deterioration of the light transmission characteristics, the bend radius of the optical waveguide 105 inserted in the passage 106b may be kept equal to or smaller than 3 mm.

Figure 2A:
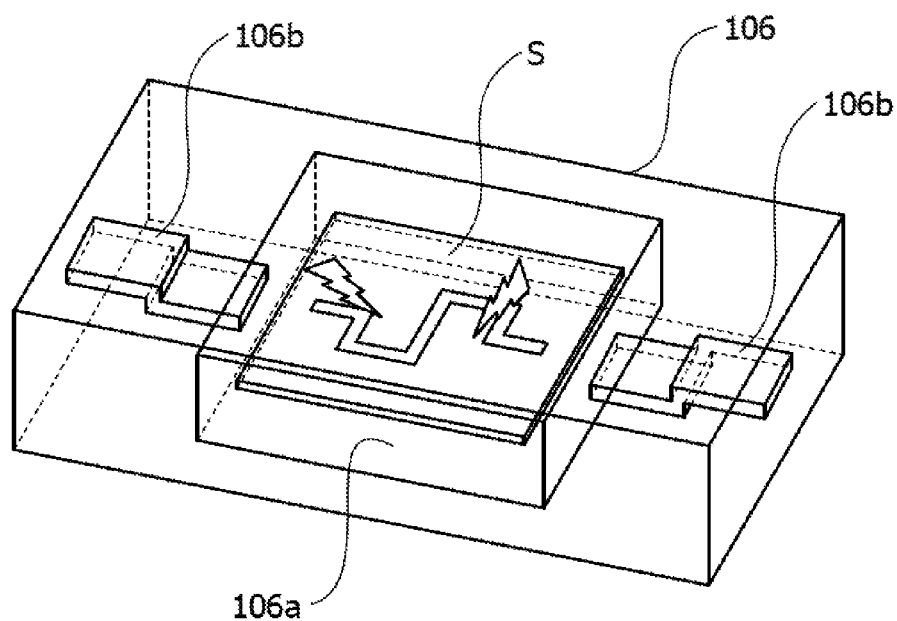
FIG. 2A illustrates one example of a perspective view of a model of an optical module.
Figure 2B:
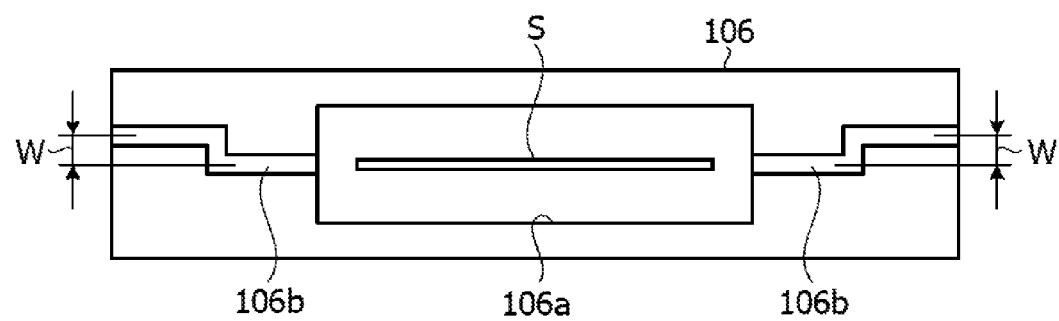
FIG. 2B illustrates one example of a side sectional view of a model of an optical module.

For example, a simulation may be carried out in which the optical module 100 is modeled and the width of the step of the passage 106b along the thickness direction of the FPC 103 is employed as a parameter. FIG. 2A illustrates one example of a perspective view of a model of an optical module. FIG. 2B illustrates one example of a side sectional view of a model of an optical module.

As illustrated in FIG. 2A and FIG. 2B, in the model of the optical module as the simulation target, one electromagnetic wave noise source S is set in the housing part 106a of the chassis 106 and two passages 106b are made to communicate with the housing part 106a. In the simulation, by using the model illustrated in FIG. 2A and FIG. 2B, how the amount of radiation of the electromagnetic wave noise from the passage 106b changes when the width W of the step of the passage 106b along the thickness direction of the FPC 103 is changed is checked.

Figure 3:
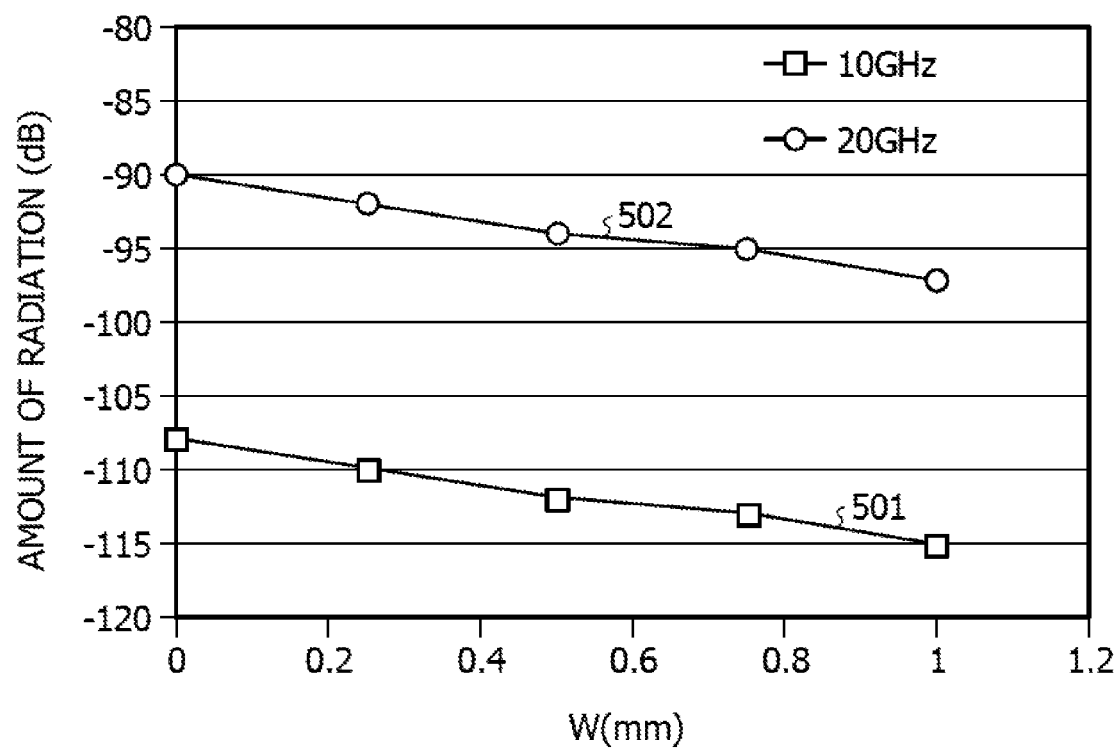
FIG. 3 illustrates one example of a simulation result.

FIG. 3 illustrates one example of a simulation result. In FIG. 3, the abscissa axis indicates the width W (mm) of the step of the passage 106b along the thickness direction of the FPC 103 and the ordinate axis indicates the amount of radiation (dB) of the electromagnetic wave noise from the passage 106b. In FIG. 3, a graph 501 represents a simulation result when the electromagnetic wave noise source S generates electromagnetic wave noise of 10 GHz and a graph 502 represents a simulation result when the electromagnetic wave noise source S generates electromagnetic wave noise of 20 GHz.

As illustrated in FIG. 3, compared with the case in which the width W of the step of the passage 106b along the thickness direction of the FPC 103 is "0," the amount of radiation of the electromagnetic wave noise from the passage 106b decreases when the width W is larger than "0." For example, if the step of the passage 106b along the thickness direction of the FPC 103 exists, the electromagnetic wave noise generated in the housing part 106a is blocked by the step of the passage 106b. As illustrated in FIG. 3, the amount of radiation of the electromagnetic wave noise from the passage 106b is lower when the width W of the step of the passage 106b along the thickness direction of the FPC 103 is larger.

The optical module 100 includes the FPC 103, the optical waveguide 105, and the chassis 106. The FPC 103 may be a board equipped with the photoelectric conversion element 104 that carries out photoelectric conversion. The optical waveguide 105 may be a flexible optical waveguide that extends from the FPC 103 and guides light output from the photoelectric conversion element 104 or light to be input to the photoelectric conversion element 104. The chassis 106 includes the housing part 106a and the passage 106b. The housing part 106a houses the FPC 103 and so forth. The passage 106b is a passage that leads the optical waveguide 105 to the outside of the housing part 106a and bends in such a manner that a step due to a depression along the thickness direction of the FPC 103 is formed. For example, the passage 106b bends in such a manner that the step is formed along the wave guiding direction of the optical waveguide 105. For this reason, electromagnetic wave noise generated in the housing part 106a (for example, electromagnetic wave noise radiated from the FPC 103, the printed board 101, and so forth) is blocked by the step of the passage 106b. As a result, electromagnetic wave noise that leaks from the passage 106b that leads out the optical waveguide 105 might be reduced.

Figure 4:
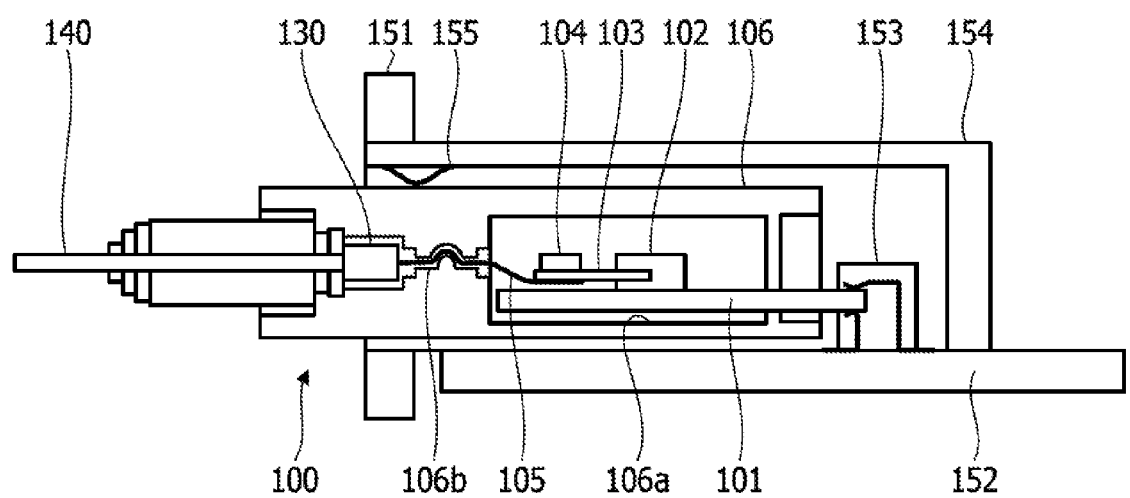
FIG. 4 illustrates one example of an internal configuration of an optical module.

FIG. 4 illustrates one example of an internal configuration of an optical module. The optical module illustrated in FIG. 4 may include the same configuration as or similar configuration to the optical module 100 illustrated in FIG. 1 except for the shape of the passage 106b of the chassis 106. Thus, a constituent element common to FIG. 1 might be given the same reference symbol and detailed description thereof might be omitted.

As illustrated in FIG. 4, the passage 106b of the chassis 106 bends in such a manner that plural steps due to depressions along the thickness direction of the FPC 103 are formed. For example, the passage 106b bends in such a manner that the plural steps are formed along the wave guiding direction of the optical waveguide 105. In FIG. 4, the passage 106b bends into a circular arc shape so that two steps due to depressions along the thickness direction of the FPC 103 may be formed.

In the optical module 100 illustrated in FIG. 4, the passage 106b of the chassis 106 bends in such a manner that plural steps due to depressions along the thickness direction of the FPC 103 are formed. For example, the passage 106b bends in such a manner that the plural steps are formed along the wave guiding direction of the optical waveguide 105. For this reason, electromagnetic wave noise generated in the housing part 106a (for example, electromagnetic wave noise radiated from the FPC 103, the printed board 101, and so forth) is blocked by the plural steps of the passage 106b in a stepwise manner. As a result, electromagnetic wave noise that leaks from the passage 106b that leads out the optical waveguide 105 might be further reduced.

Figure 5:
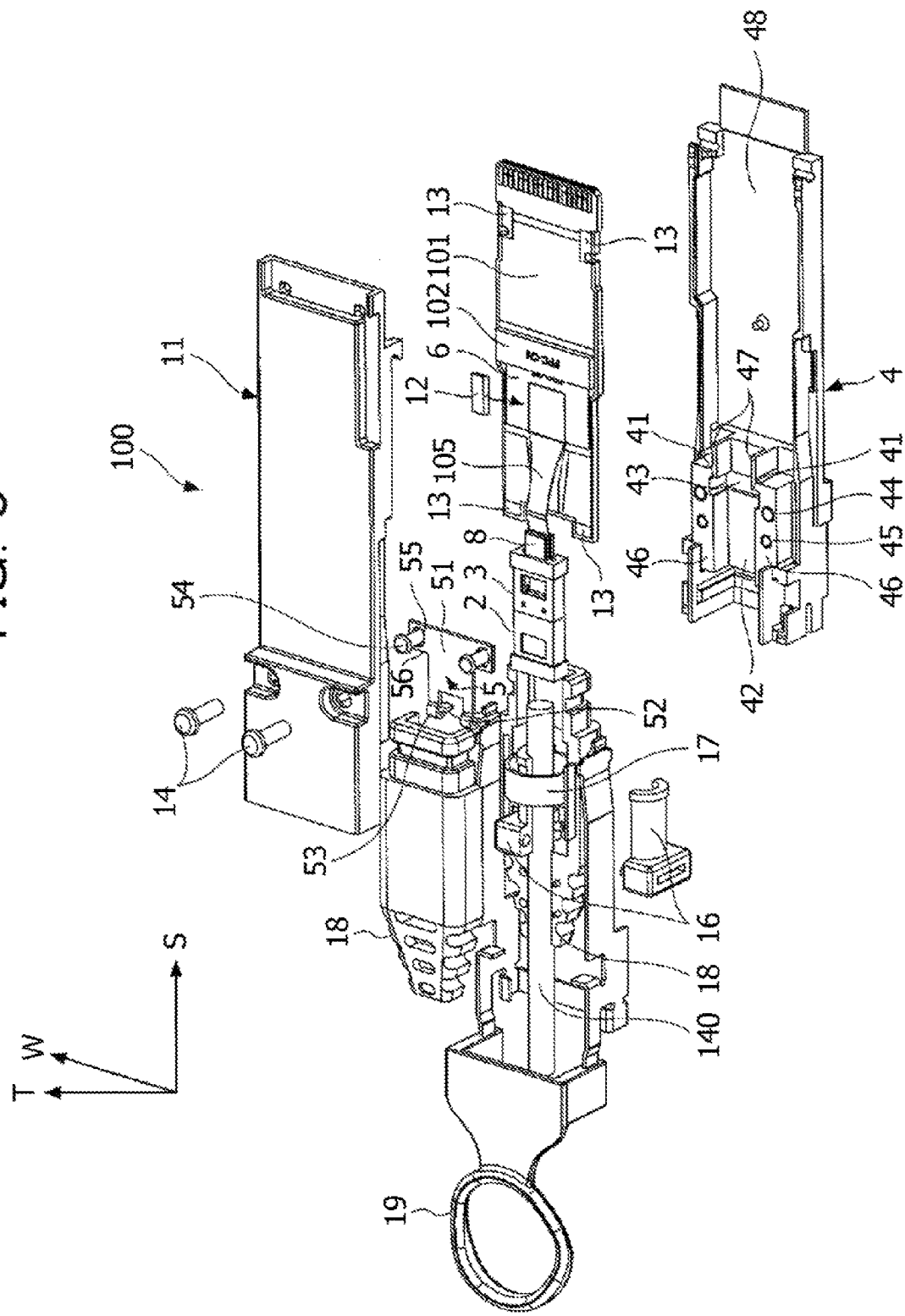
FIG. 5 illustrates one example of an exploded perspective view of an overall configuration of an optical module.

The above-described optical module 100 may be applied to e.g. an optical module whose chassis is split into an upper cover and a lower cover in terms of improvement in the assemblability. FIG. 5 illustrates one example of an exploded perspective view illustrating an overall configuration of an optical module.

As illustrated in FIG. 5, the optical module 100 includes a mechanically transferable (MT) ferrule 2 and a lens-equipped ferrule 3 positioned to the MT ferrule 2 with the intermediary of a positioning pin. The optical module 100 further includes a lower cover 4 in which a support part 41 that supports the lens-equipped ferrule 3 from the side of a coupling direction S is formed and a ferrule clip 5 that is fastened and fixed to the lower cover 4 and presses the MT ferrule 2 in the direction toward the lens-equipped ferrule 3. The support part 41 is a wall surface that faces in the opposite direction to the coupling direction S.

In FIG. 5, "S" refers to the coupling direction of the MT ferrule 2 with respect to the lens-equipped ferrule 3. "T" refers to the thickness direction from the bottom of the lower cover 4 of the optical module 100 having a flat plate shape toward the opening. "W" refers to the width direction perpendicular to the coupling direction S and the thickness direction T. The arrow of the thickness direction T is deemed as an arrow indicating the upper side for convenience of diagrammatic representation, and the arrow of the width direction W indicates the left side as viewed in the coupling direction S. The coupling direction S may have directionality and the thickness direction T and the width direction W do not need to have directionality.

The MT ferrule 2 includes a substantially rectangular parallelepiped shape and includes an enlarged part that enlarges in the width direction W and the thickness direction T on the opposite side to the coupling direction S. The lens-equipped ferrule 3 also includes a substantially rectangular parallelepiped shape and includes an enlarged part that enlarges in the width direction W and the thickness direction T on the side of the coupling direction S. The support part 41 of the lower cover 4 supports the right end surface of the enlarged part of the lens-equipped ferrule 3.

The ferrule clip 5 includes a plate-shaped part 51 fastened and fixed to the lower cover 4, a pair of abutting parts 52 that abut against the left end surface of the MT ferrule 2, and a pair of spring parts 53 that link the pair of abutting parts 52 and the plate-shaped part 51 and generate a biasing force to bias the abutting parts 52 toward the side of the MT ferrule 2. The material of the ferrule clip 5 may be a metal having flexibility for example. The ferrule clip 5 includes screw parts 54 for fastening and fixing to the lower cover 4 and screw holes 55 in which the screw parts 54 are inserted. The plate-shaped part 51 includes a pair of ear parts 56 corresponding to the screw holes 55.

The lower cover 4 includes a U-shaped notch part 42 to which the MT ferrule 2 and the lens-equipped ferrule 3 are fitted to be positioned. On the side of the support part 41 relative to the notch part 42, a housing part 43 to house the enlarged part of the lens-equipped ferrule 3 is formed. The housing part 43 is formed wider in the width direction W and deeper in the thickness direction T than the notch part 42. The lower cover 4 includes a pair of female screw parts 44 corresponding to screws 14 for an upper cover 11 and a pair of female screw parts 45 corresponding to the screw parts 54 for the ferrule clip 5 in a block part 46 located outside the notch part 42 in the width direction W. The female screw parts 44 are located closer to the support part 41 than the female screw parts 45. A pair of housing walls 47 to house a ferrule boot 8 are formed on the side of the coupling direction S relative to the support part 41. The lens-equipped ferrule 3 and the ferrule boot 8 may correspond to the optical connector 130 illustrated in FIG. 1.

The optical module 100 includes the optical waveguide 105 led out from the lens-equipped ferrule 3 toward a photoelectric converter 6 and the ferrule boot 8 that bends the optical waveguide 105. The ferrule boot 8 is disposed at a shorter distance from the photoelectric converter 6 than the length of the optical waveguide 105 and thereby the optical waveguide 105 is kept at the bending state. The photoelectric converter 6 may correspond to the FPC 103 and the photoelectric conversion element 104 illustrated in FIG. 1.

The optical module 100 includes the printed board 101 and the electrical connector 102 mounted on a given site of the printed board 101 and the photoelectric converter 6 is coupled to the electrical connector 102 and disposed on the printed board 101. A card edge connector is formed at the right end of the printed board 101.

The optical module 100 includes the upper cover 11 that seals the opening possessed by the lower cover 4 and a heat dissipation sheet 12 that conducts heat generated by the photoelectric converter 6 to the upper cover 11 to dissipate the heat.

The printed board 101 has a form in which the part from the part at which the electrical connector 102 is disposed to the card edge connector is wider in the width direction W than the part at which the photoelectric converter 6 is mounted. The printed board 101 is housed in a board housing part 48 located on the side of the coupling direction S relative to the housing walls 47 of the lower cover 4.

The optical cable 140 is led out from the opposite side of the MT ferrule 2 to the coupling direction S. The optical cable 140 is housed in a pair of cable boots 18 with the intermediary of a pair of sleeves 16 and a swaging ring 17. A pull-tab/latch 19 is mounted to the cable boots 18.

A synthetic resin member 13 is disposed at a given position on the printed board 101 in order to fill a gap formed between the printed board 101 and the upper cover 11.

An integrated circuit (IC) such as Retimer that carries out waveform shaping of a high-speed signal may be mounted on a high-speed signal transmission path between the card edge connector at the right end of the printed board 101 and the electrical connector 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical module comprising:
    a board configured to be equipped with an optical element that carries out photoelectric conversion;
    a flexible optical waveguide configured to guide light output from the optical element or light to be input to the optical element; and
    a chassis including:
    a housing part configured to house the board, and
    a passage configured to lead the flexible optical waveguide to outside of the housing part to reach an optical connector and bend in such a manner that steps are formed along a wave guiding direction of the flexible optical waveguide,
    wherein a first portion at which the passage goes out from the housing part and a second portion at which the passage reaches the optical connector are provided at the same level in a vertical direction and each of the steps has a circular arc shape.

2. The optical module according to claim 1, wherein the passage leads the flexible optical waveguide to the outside of the housing part in a state in which a bend radius of the flexible optical waveguide is kept equal to or smaller than 3 mm.

3. The optical module according to claim 1, wherein a width of the passage is so set that a bend radius of the flexible optical waveguide is kept equal to or smaller than 3 mm.

4. The optical module according to claim 1, wherein the flexible optical waveguide is a polymer waveguide.

5. An optical module comprising:
    a board configured to be equipped with an optical element that carries out photoelectric conversion;
    a flexible optical waveguide configured to guide light output from the optical element or light to be input to the optical element;
    a housing part configured to house the board; and
    a passage configured to lead the flexible optical waveguide to outside of the housing part and couple the flexible optical waveguide to an optical connector,
    wherein the passage goes out from the housing part in parallel with a surface of the board, extends in parallel with the surface of the board in a first direction perpendicular to a side surface of the housing part along a first part of the passage, changes a extending direction to in a second direction along the side surface of the housing part along a wall of the passage that is formed at an end part of the first part and extends in the second direction, extends in the second direction in parallel with the side surface of the housing part in such a manner the flexible optical waveguide in the passage does not become in parallel with the side surface of the housing part, and then extends in the first direction along a second part of the passage that is coupled to an end part of the wall and is along the first direction.

6. The optical module according to claim 5, wherein the passage includes a step.

7. The optical module according to claim 5, wherein the passage leads the flexible optical waveguide to the outside of the housing part in a state in which a bend radius of the flexible optical waveguide is kept equal to or smaller than three mm.

8. The optical module according to claim 5, wherein a width of the passage is so set that a bend radius of the flexible optical waveguide is kept equal to or smaller than three mm.

9. The optical module according to claim 5, wherein the flexible optical waveguide is a polymer waveguide.

10. An optical module comprising:
    a ferrule;
    a photoelectric converter provided over a board, the photoelectric converter and the board housed in a housing part;
    an optical waveguide configured to be led out from the photoelectric converter toward the ferrule and extend along a passage; and
    a ferrule boot disposed on a side of the ferrule and at a shorter distance from the photoelectric converter than a length of the optical waveguide to keep the optical waveguide at a bending state,
    wherein the passage goes out from the housing part in parallel with a surface of the board, extends in parallel with the surface of the board in a first direction perpendicular to a side surface of the housing part along a first part of the passage, changes an extending direction to in a second direction along the side surface of the housing part along a wall of the passage that is formed at an end part of the first part and extends in the second direction, extends in the second direction in parallel with the side surface of the housing part in such a manner the optical waveguide in the passage does not become in parallel with the side surface of the housing part, and then extends in the first direction along a second part of the passage that is coupled to an end part of the wall and is along the first direction.

* * * * *